US012231325B2

(12) United States Patent
Mishra

(10) Patent No.: US 12,231,325 B2
(45) Date of Patent: Feb. 18, 2025

(54) SYSTEMS AND METHODS FOR CONNECTING IPV4 ISLANDS OVER AN IPV6 CORE NETWORK USING IPV4 PROVIDER EDGE ROUTERS

(71) Applicant: Verizon Patent and Licensing Inc., Basking Ridge, NJ (US)

(72) Inventor: Gyan S. Mishra, Boyds, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 228 days.

(21) Appl. No.: 17/661,383

(22) Filed: Apr. 29, 2022

(65) Prior Publication Data
US 2023/0353480 A1    Nov. 2, 2023

(51) Int. Cl.
| | | |
|---|---|---|
| H04L 45/02 | (2022.01) | |
| H04L 45/50 | (2022.01) | |
| H04L 61/251 | (2022.01) | |
| H04L 101/659 | (2022.01) | |
| H04L 101/686 | (2022.01) | |

(52) U.S. Cl.
CPC ............ *H04L 45/04* (2013.01); *H04L 45/50* (2013.01); *H04L 61/251* (2013.01); *H04L 2101/659* (2022.05); *H04L 2101/686* (2022.05)

(58) Field of Classification Search
CPC ....... H04L 45/04; H04L 45/50; H04L 61/251; H04L 2101/659; H04L 2101/686; H04L 12/4604; H04L 61/00; H04L 2012/4629; H04L 2101/668; H04L 45/741
See application file for complete search history.

(56) References Cited

U.S. PATENT DOCUMENTS

| | | | | |
|---|---|---|---|---|
| 7,246,175 B1 * | 7/2007 | Tappan | ................. | H04L 61/251 370/392 |
| 9,191,318 B1 * | 11/2015 | Van de Velde | ..... | H04L 61/2592 |
| 2008/0170578 A1 * | 7/2008 | Ould-Brahim | ...... | H04L 12/4641 370/401 |
| 2009/0116483 A1 * | 5/2009 | Anumala | ................ | H04L 45/04 370/409 |
| 2013/0266013 A1 * | 10/2013 | Dutta | ...................... | H04L 45/28 370/392 |

(Continued)

OTHER PUBLICATIONS

"IPv4 and IPV6 Infrastructure Addresses in BGP Updates for Multicast VPN", Request for Comments (RFC) 6515; Aggarwal; Feb. 2012 (Year: 2012).*

(Continued)

*Primary Examiner* — Benjamin H Elliott, IV

(57) ABSTRACT

In some implementations, a first network device may encode Internet Protocol version 4 (IPv4) network layer reachability information (NLRI) using Internet Protocol version 6 (IPv6) next hop encoding to generate encoded IPv4 NLRI. The first network device may include information indicating border gateway protocol (BGP) labeled unicast (BGP-LU) in the encoded IPv4 NLRI. The first network device may advertise the encoded IPv4 NLRI. The first network device may establish a communication session with a second network device, wherein the communication session is established via an IPv6 core network. The first network device may forward, via the communication session, one or more IPv4 packets using the encoded IPv4 NLRI.

20 Claims, 14 Drawing Sheets

(56) References Cited

U.S. PATENT DOCUMENTS

| | | | | |
|---|---|---|---|---|
| 2015/0244628 | A1* | 8/2015 | Gredler | H04L 47/724 370/236 |
| 2015/0295888 | A1* | 10/2015 | Maslak | H04L 69/06 709/219 |
| 2017/0310589 | A1* | 10/2017 | Tambakuwala | H04L 61/25 |
| 2017/0373973 | A1* | 12/2017 | Bickhart | H04L 45/64 |
| 2018/0109450 | A1* | 4/2018 | Filsfils | H04L 45/04 |
| 2018/0351857 | A1* | 12/2018 | Vairavakkalai | H04L 63/0272 |
| 2018/0351864 | A1* | 12/2018 | Jeganathan | H04L 45/021 |
| 2019/0166048 | A1* | 5/2019 | Srinivasan | H04L 45/745 |
| 2021/0336870 | A1* | 10/2021 | Zhao | H04L 45/50 |
| 2022/0345438 | A1* | 10/2022 | Mishra | H04L 45/50 |
| 2023/0275869 | A1* | 8/2023 | Mishra | H04L 61/5069 709/245 |
| 2023/0353480 | A1* | 11/2023 | Mishra | H04L 12/4604 |
| 2023/0370372 | A1* | 11/2023 | Mishra | H04L 45/04 |

OTHER PUBLICATIONS

"Evaluating an IPV4 and IPV6 Network"; Lidholm et al.; Bachelor's Thesis Kth Royal Institute of Technology; Sep. 8, 2012 (Year: 2012).*
"Segment Routing Prefix Segment Identifier Extensions for BGP"; Request for Comments (RFC) 8669; Previdi et al.; Dec. 2019 (Year: 2019).*
"Advertising IPV4 Network Layer Reachability Information (NLRI) with an IPV6 Next Hop"; Request for Comments (RFC) 8950; Litkowski et al.; Nov. 2020 (Year: 2020).*
"Connecting IPV6 Islands over IPV4 MPLS Using IPv6 Provider Edge Routers (6PE)"; Request for Comments (RFC) 4798; Clercq et al.; Feb. 2007 (Year: 2007).*
"Connecting IPV4 Islands over IPv6 Core using IPV4 Provider Edge Routers (4PE)"; Internet draft: draft-mishra-idr-v4-islands-v6-core-4pe-00; Mishra et al.; May 18, 2022 (Year: 2022).*
RFC 5492; Capabilities Advertisement with BGP-4; Feb. 2009; 7 pages.
RFC 4364; BGP/MPLS IP Virtual Private Networks (VPNs); Feb. 2006; 47 pages.
RFC 4659; BGP-MPLS IP Virtual Private Network (VPN) Extension for IPV6 VPN; Sep. 2006; 18 pages.
RFC 2545; Use of BGP-4 Multiprotocol Extensions for IPV6 Inter-Domain Routing; Mar. 1999; 5 pages.
RFC 4291; IP Version 6 Addressing Architecture; Feb. 2006; 25 pages.
RFC 8277; Using BGP to Bind MPLS Labels to Address Prefixes; Oct. 2017; 23 pages.
RFC 5565; Softwire Mesh Framework; Jun. 2009; 31 pages.
RFC 8950; Advertising IPv4 Network Layer Reachability Information (NLRI) with an IPV6 Next Hop; Nov. 2020; 12 pages.
RFC 1812; Requirements for IP Version 4 Routers; Jun. 1995; 175 pages.
RFC 3032; MPLS Label Stack Encoding; Jan. 2001; 23 pages.
RFC 3270; Multi-Protocol Label Switching (MPLS) Support of Differentiated Services; May 2002; 64 pages.
RFC 4182; Removing a Restriction on the use of MPLS Explicit NULL; Sep. 2005; 7 pages.
RFC 3031; Multiprotocol Label Switching Architecture; Jan. 2001; 61 pages.
RFC 3036; LDP Specification; Jan. 2001; 132 pages.
RCF 4029; Scenarios and Analysis for Introducing IPv6 into ISP Networks; Mar. 2005; 28 pages.
RCF 4271; A Border Gateway Protocol 4 (BGP-4); Jan. 2006; 104 pages.
RFC 4443; Internet Control Message Protocol (ICMPv6) for the Internet Protocol Version 6 (IPv6) Specification; Mar. 2006; 24 pages.
RFC 4925; Softwire Problem Statement; Jul. 2007; 23 pages.
RFC 6074; Provisioning, Auto-Discovery, and Signaling in Layer 2 Virtual Private Networks (L2VPNs)Jan. 2011; 32 pages.
RFC 4684; Constrained Route Distribution for Border Gateway Protocol/MultiProtocol Label Switching (BGP/MPLS) Internet Protocol (IP) Virtual Private Networks (VPNs); Nov. 2006; 14 pages.
RFC 6513; Multicast in MPLS/BGP IP VPNs; Feb. 2012; 88 pages.
RFC 6514; BGP Encodings and Procedures for Multicast in MPLS/BGP IP VPNs; Feb. 2012; 59 pages.
Internet Assigned Numbers Authority; Capability Codes; Feb. 19, 2021; 2 pages.

* cited by examiner

SYSTEMS AND METHODS FOR CONNECTING IPV4 ISLANDS OVER AN IPV6 CORE NETWORK USING IPV4 PROVIDER EDGE ROUTERS

BACKGROUND

Border gateway protocol (BGP) is a standardized exterior gateway protocol designed to exchange routing and reachability information among autonomous systems (ASs). BGP is classified as a path-vector routing protocol, and makes routing decisions based on paths, network policies, or rule sets configured by a network administrator. BGP used for routing within an AS is called internal BGP (iBGP) and BGP used for routing outside of the AS is called external BGP (eBGP).

DETAILED DESCRIPTION OF PREFERRED EMBODIMENTS

Figure 1A:
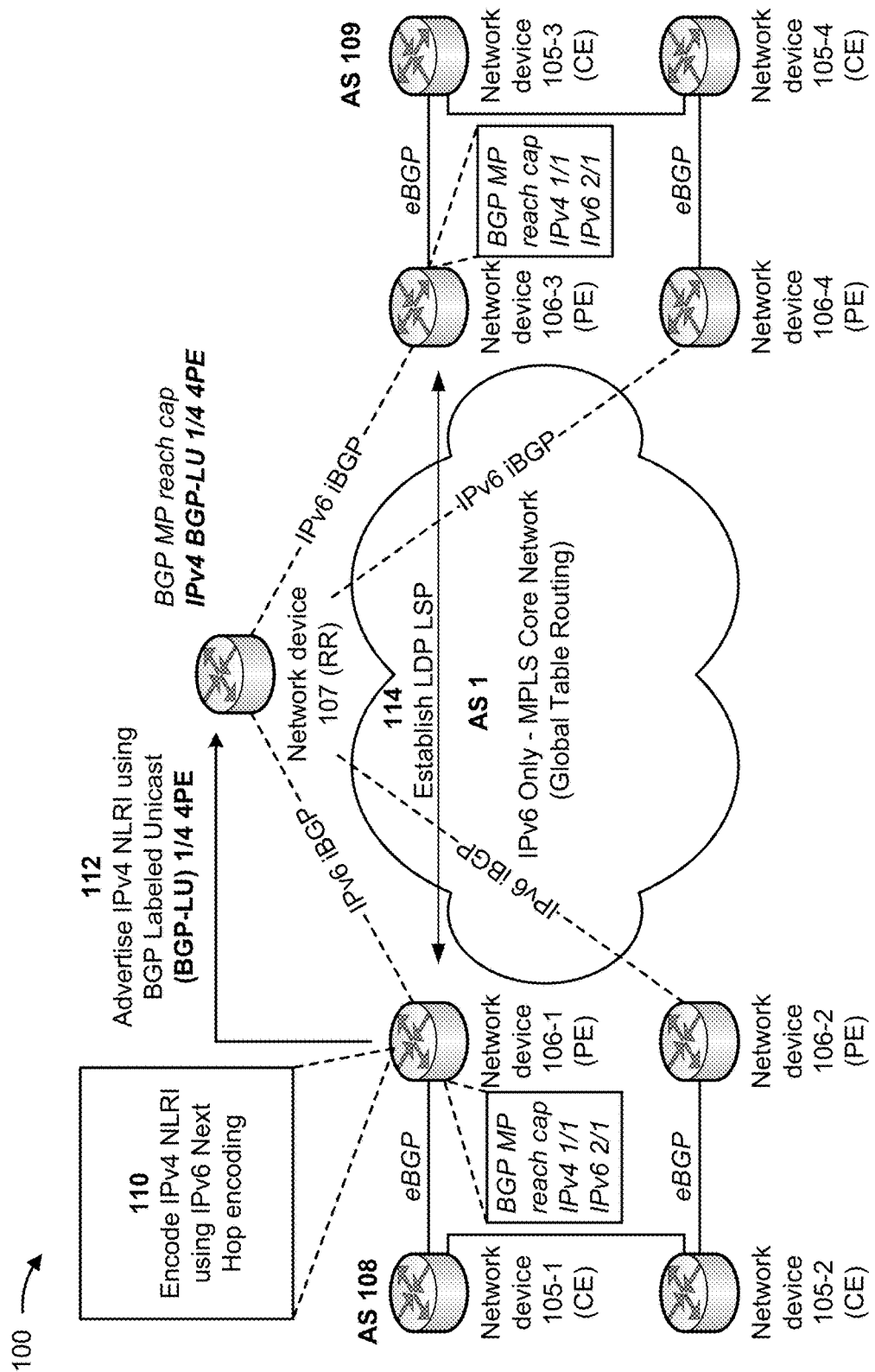
FIGS. 1A-1J are diagrams of an example associated with connecting Internet Protocol version 4 (IPv4) Islands over an Internet Protocol version 6 (IPv6) core network.

The following detailed description of example implementations refers to the accompanying drawings. The same reference numbers in different drawings may identify the same or similar elements.

Multiprotocol border gateway protocol (MP-BGP) provides an ability to associate a network layer protocol with next hop information and network layer reachability information (NLRI). Border gateway protocol (BGP) advertises Internet Protocol version 4 (IPv4) NLRI and Internet Protocol version 6 (IPv6) NLRI using MP-BGP reachability capability (referred to hereinafter as "MP_REACH capability"). MP_REACH capability is exchanged between BGP peers for a particular address family identifier (AFI) and a subsequent address family identifier (SAFI) 2-tuple combination. AFI and SAFI 2-tuple combinations are typically advertised using IPv4 next hop encoding or IPv6 next hop encoding. The AFI/SAFI combination are represented hereinafter as "X/Y" where the X is the Address Family Identifier is either Protocol value "1" for IPv4 protocol or value "2" for IPv6 protocol and the Y is the Subsequent Address Family Identifier.

Typically, BGP peering may be used to advertise NLRI. A provider edge network device in MPLS terms called a Label Edge Router (LER) in this document may be referred to hereinafter as "PE." A provider network device in MPLS terms called a Label Switch Router (LSR) may be referred to hereinafter as "P". A route reflector network device will be referred to hereinafter as "RR". A customer edge network device may be referred to hereinafter as "CE." External BGP (eBGP) peering types may include provider edge to customer edge peering (which may be referred to as "PE-CE peering"), inter-autonomous system boundary Router (Inter-ASBR) to Autonomous System Boundary Router (ASBR) peering, and/or provider edge to provider edge peering. The Inter-ASBR to ASBR peering and the provider edge to provider edge peering (which may be referred to hereinafter as "Inter-AS peering".) An internal BGP (iBGP) peering type may include PE to route reflector (RR) peering (which may be referred to hereinafter as "Core-Peering").

Historically, MIP-BGP may advertise IPv4 NLRI and IPv6 NLRI and set a next hop to an address family to which the next hop belongs, as the NLRI advertised would have to match a protocol of the next hop. MIP-BGP with the BGP capability extension IANA (Internet Assigned Numbering Authority) assigned capability value "5" associated with the "Extended Next-Hop" encoding can now be used to dynamically discover whether IPv4 NLRI and VPN-IPv4 NLRI may be exchanged over an IPv6 next hop. The BGP capability extension applies to all BGP peering types (e.g., iBGP peering and eBGP peering).

In some situations, a softwire mesh framework may be used to establish a connection between network devices. The softwire mesh framework may be based on an overlay and underlay technology framework. The overlay may be a VPN overlay and may act as a tunneled virtualization layer containing a customer payload. The underlay may act as a transport layer. The softwire mesh framework relates to a transmission of IPv4 packets at the edge of a network by way of tunneling the IPv4 packets over an IPv6 network. The use of overlay technologies requires an explicit tunnel configuration. Such explicit tunnel configuration is performed manually (using computing devices) and, accordingly, is a time consuming process. In this regard, configuring tunnels manually consumes computing resources, network resources, storage resources, among other examples.

Implementations described herein are directed to connecting IPv4 Island networks over an IPv6-only core network using a PE that is configured to provide connectivity for an IPv4 Island over an IPv6-only core network. Such PE may be referred to as "4PE." An IPv4 Island network may include a network that includes Layer 3 network devices (e.g., router network nodes) that are configured according to IPv4-only. Such Layer 3 network devices are called Islands as they do not have any means of connectivity to a network external with respect to an IPv4 Island network with which such Layer 3 network devices associated.

Implementations described herein describes a 4PE framework for connecting IPv4 Islands over an IPv6-only core network. The 4PE framework involves transmission of IPv4 packets related to the provider edge to provider edge peering and to the core peering. The 4PE framework further involves the IANA (Internet Assigned Numbering Authority) assigned capability value of "5" associated with the "Extended Next Hop Encoding" over an IPv6 peer for forwarding of IPv4 packets (e.g., via the Inter-AS peering or Core Intra-AS peering over an IPv6-only interface). Such IPv6-only interface may be configured on each adjacent network device.

The 4PE framework addresses an operator core network paradigm shift from a single protocol IPv4-Only core network towards a single protocol IPv6-Only core network. Additionally, the 4PE framework interconnects IPv4 Islands over a multiprotocol label switching (MPLS) label distribution protocol (LDP) IPv6 core network, a segment routing (SR) MPLS IPv6 core network, or an SR over IPv6 (SRv6) core network. The 4PEs may exchange IPv4 network layer reachability information transparently over the core network using the MP-BGP over IPv6. In doing so, a BGP next hop field may be used to convey an IPv6 address of a 4PE so that dynamically established IPv6-Signaled MPLS label switched paths (LSPs) or SRv6 network programming IPv6 forwarding path instantiation may be utilized without any explicit tunnel configuration.

The 4PE framework (to interconnect IPv4 Islands over an IPv6 core network) provides an alternative to using overlay technologies (e.g., generic routing encapsulation) that require an explicit tunnel configuration. The 4PE framework provides a solution for MPLS as well as for SR. Tunnels (associated with the 4PE framework) are established dynamically using existing MPLS signaling or SRv6 network programming, thereby addressing situations that may not be suitable to explicitly configuring tunnels. By connecting the IPv4 Islands without explicitly configuring a tunnel as described herein, implementations described herein may preserve computing resources, network resources, storages resources, among other examples that would have otherwise been consumed by manually configuring the tunnel.

Under implementations described herein, the PEs and the CEs, of IPv4 Islands, may be configured to be "Dual stacked" on each PE-CE interface. In other words, the interface between the PE and CE called an attachment circuit (AC) is configured with both an IPv4 address and an IPv6 address.

The core network may include a network device that supports a softwire mesh framework and is configured to support IPv6-only data plane to transport IPv4 packets (e.g., over a MPLS LDP core network, a SR-MPLS IPv6 core network, or a SRv6 core network).

Implementations described herein may use MP-BGP over IPv6 core network, rely on identification of the 4PEs using an IPv6 address, and use an underlay transport layer which does not require any explicit tunnel configuration. The underlay transport layer may include a label switched path (LSP) which is an LDP Signaled MPLS LSP as shown in FIGS. 1B-1D, an SR-LSP signaled SR-MPLS LSP as shown in FIGS. 1E-1G, or an underlay SRv6 traffic engineering (SRv6-TE) or best effort (SRv6-BE) path instantiation as shown in FIGS. 1H-1J.

Implementations described herein relate to a global table routing only framework and does not involve the VPN overlay routing framework used for Layer 3 VPN. The term "global table routing" may be used to describe a routing action performed when utilizing a global routing table.

FIGS. 1A-1J are diagrams of an example 100 associated with connecting IPv4 Islands over an IPv6 core network. As shown in FIGS. 1A-1J, example 100 may include a plurality of network devices 105 (individually network device 105), a plurality of network devices 106 (individually network device 106), and a plurality of network devices 107 (individually network device 107). A network device 105 may be a CE, a network device 106 may be a PE, and a network device 107 may be an RR. As shown in FIGS. 1A-1J, example 100 we have excluded the plurality of Provider (P) routers for simplicity which represents the PE to P Core facing interface as the 4PE function described in FIGS. 1A-1J resides only on the Provider Edge (PE) router. Network devices described herein may have a control plane and a data plane. The control plane may be utilized for routing updates and advertising IPv4 NLRI and IPv6 NLRI. The IPv4 data plane may be used for forwarding IPv4 packets, and the IPv6 data plane may be used for forwarding IPv6 packets. FIGS. 1A-1J describe a manner in which the control plane may be used for routing advertisement of IPv4 NLRI and IPv6 NLRI within the 4PE framework described above.

Network device 105-1, network device 105-2, may form a first IPv4 Island. The first IPv4 Island may be associated with an AS 108. Network device 105-3, network device 105-4, may form a second IPv4 Island. The second IPv4 Island may be associated with an AS 109. In some examples, network device 106-1 and 106-2 may be configured to establish connectivity between the first IPv4 Island and the second IPv4 Island over an IPv6 core network. For example, network device 106-1 and 106-2 may be a 4PE. Network device 106-1 and 106-2 may be located on a border of an IPv6 core network. Network device 106-3 and 106-4 may be a 4PE similar to network device 106-1 and 106-2 and may be located on the border of the IPv6 core network.

As explained above, a 4PE may have attachment circuits (AC) that be IPv4 and IPv6 dual stack. For example, the 4PE may have attachment circuits (AC) that may have both and IPv4 address and IPv6 address configured on the interface. The Core facing interfaces connecting from Provider Edge (PE) to Provider router (P) are the interfaces on the Provider Edge (PE) in this case 4PE device that are IPv6-Only interfaces. For example, the core facing interface would have only an IPv6 address configured on the PE to P interfaces. In some situations in the case of 4PE where the core network is IPv6-Only (e.g., for the MPLS LDP and the SR-MPLS), the IPv6 address MUST be required to be routable in the IPv6 core network. For the MPLS LDP IPv6 core network, an IPv6 prefix will have a label binding created for the prefix which represents the FEC (Forwarding Equivalency Class) destination prefix on the Egress PE for the Label Switched Path (LSP) to be created. A "Forwarding Equivalency Class" (FEC) is a in terms of MPLS is used to describe a set of packets with a similar or identical characteristics which may be forwarded in the same way and thus are bound to the same label thus creating a label binding of the FEC IPv6 Prefix to label binding.

In some examples, a 4PE that receives IPv4 packets from a local attachment circuit (e.g., from a CE) may be referred to as an ingress 4PE, relative to IPv4 packets sent by the CE. A 4PE that forwards IPv4 packets from the local attachment circuit may be referred to as an egress 4PE, relative to the IPv4 packets received by the CE. Every ingress 4PE may signal an IPv6 MPLS LSP (or instantiate an SRv6 best effort (BE) or an SR-TE) path to forward data to any egress 4PE without injecting additional prefixes into the IPv6 core network.

Figure 1B:
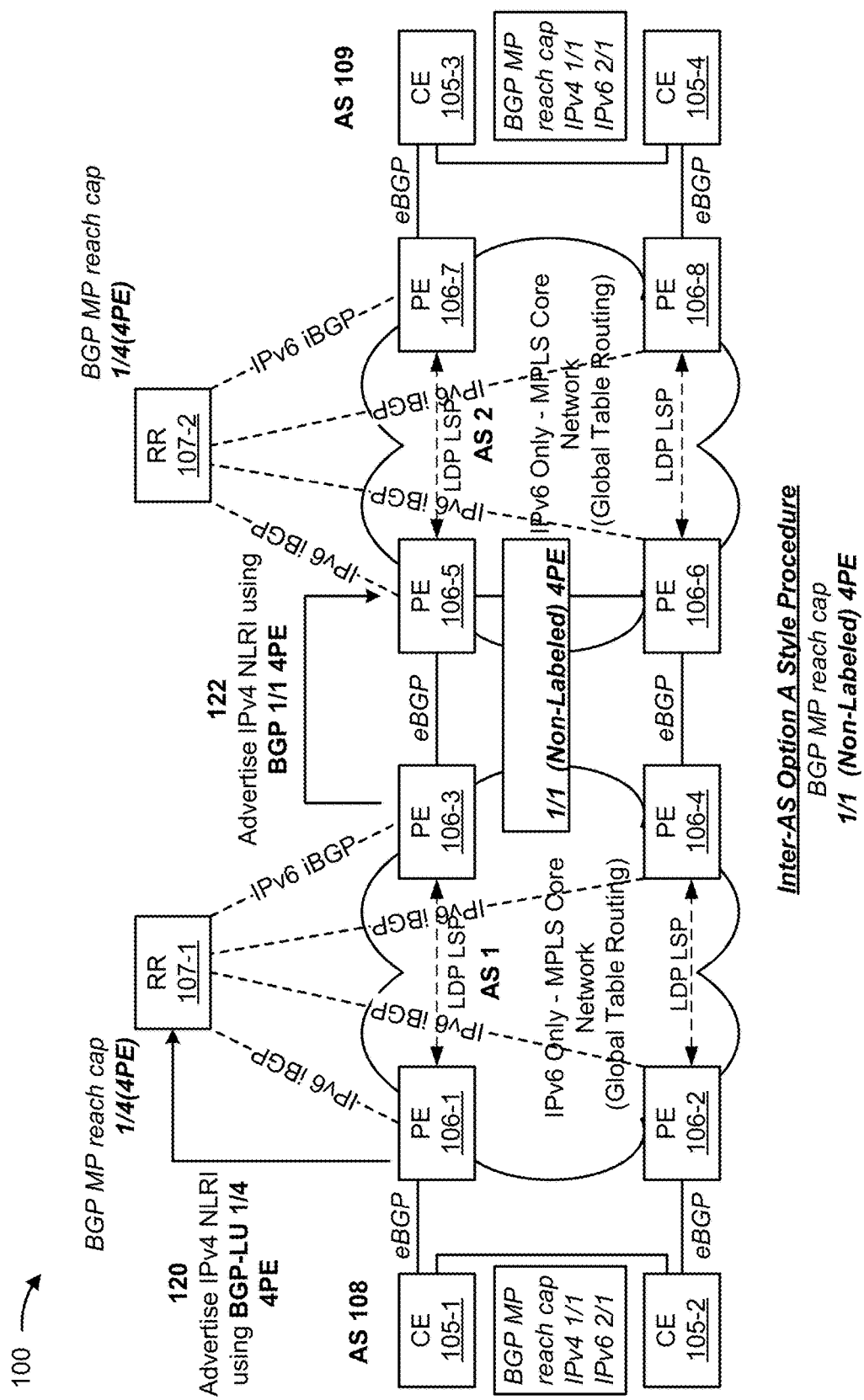
Figure 1C:
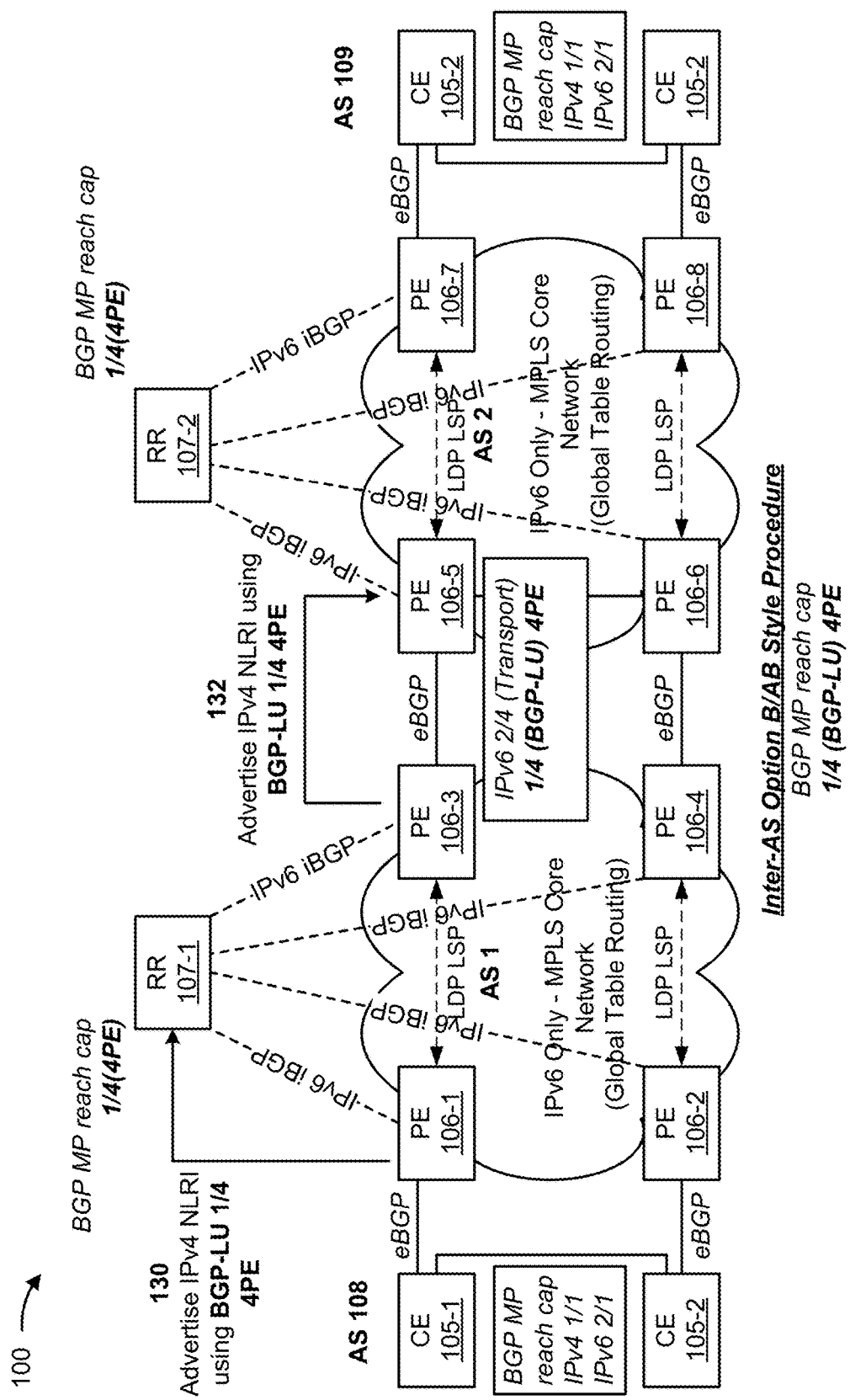
Figure 1D:
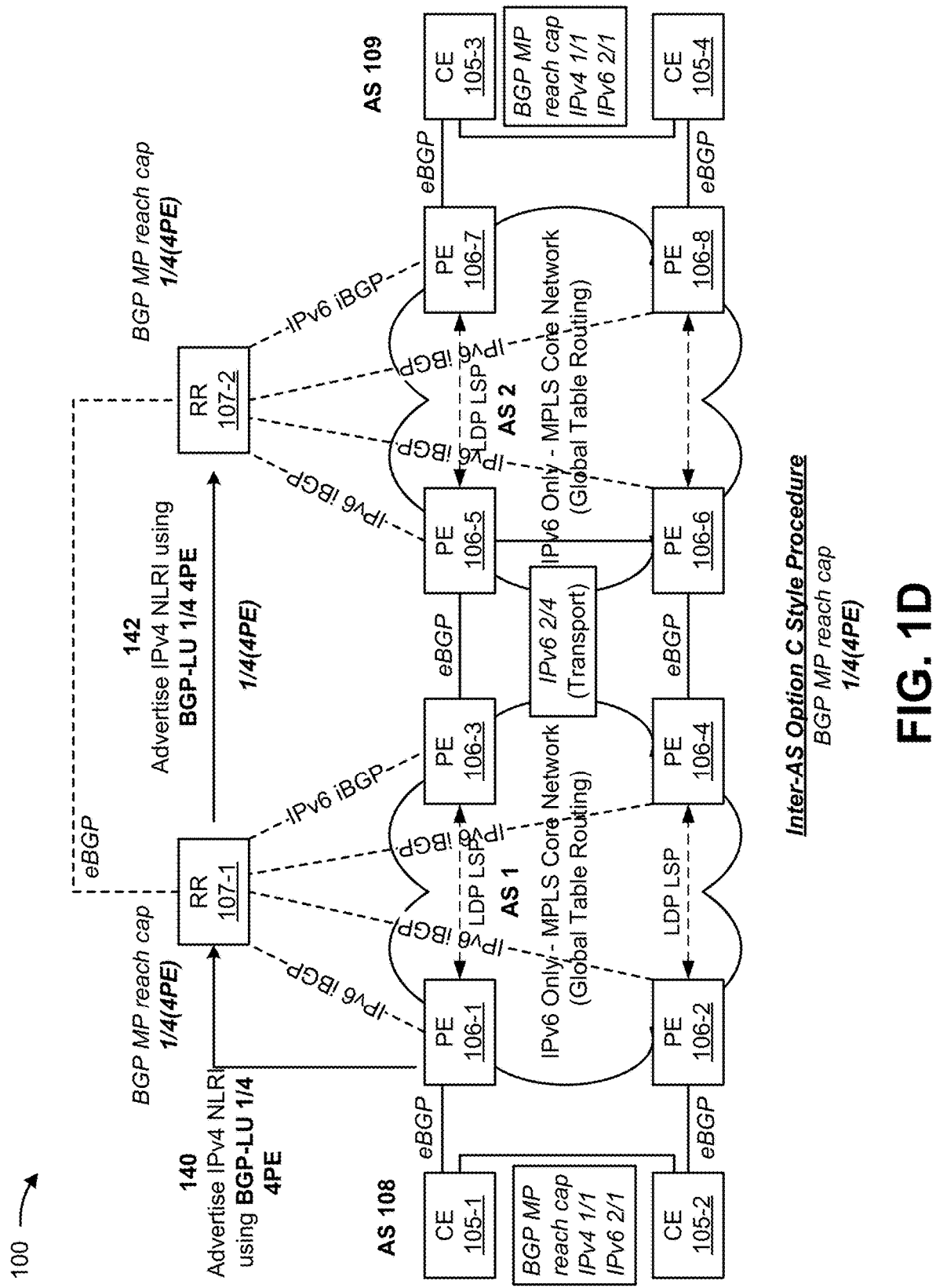
Figure 1E:
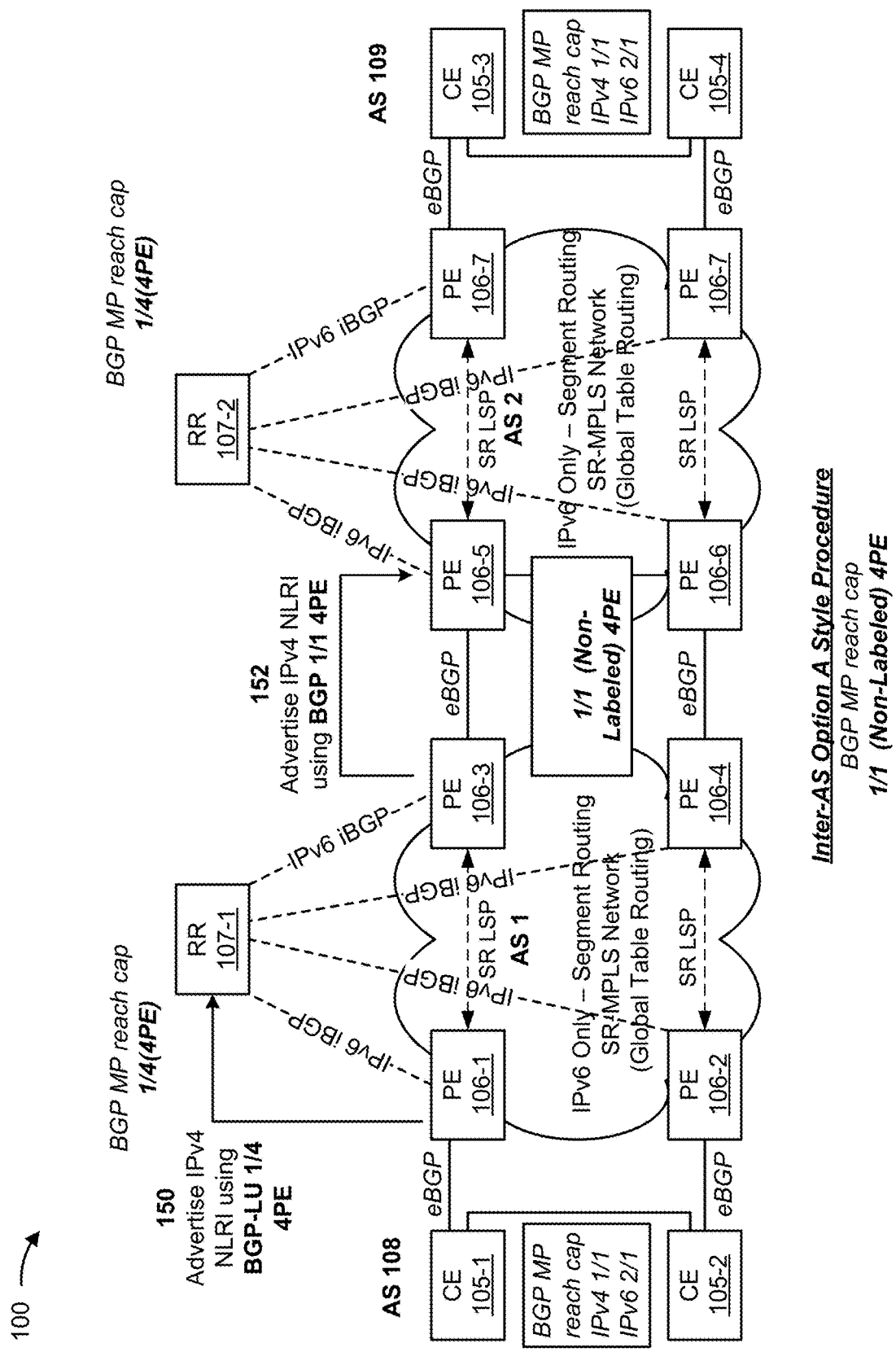
Figure 1F:
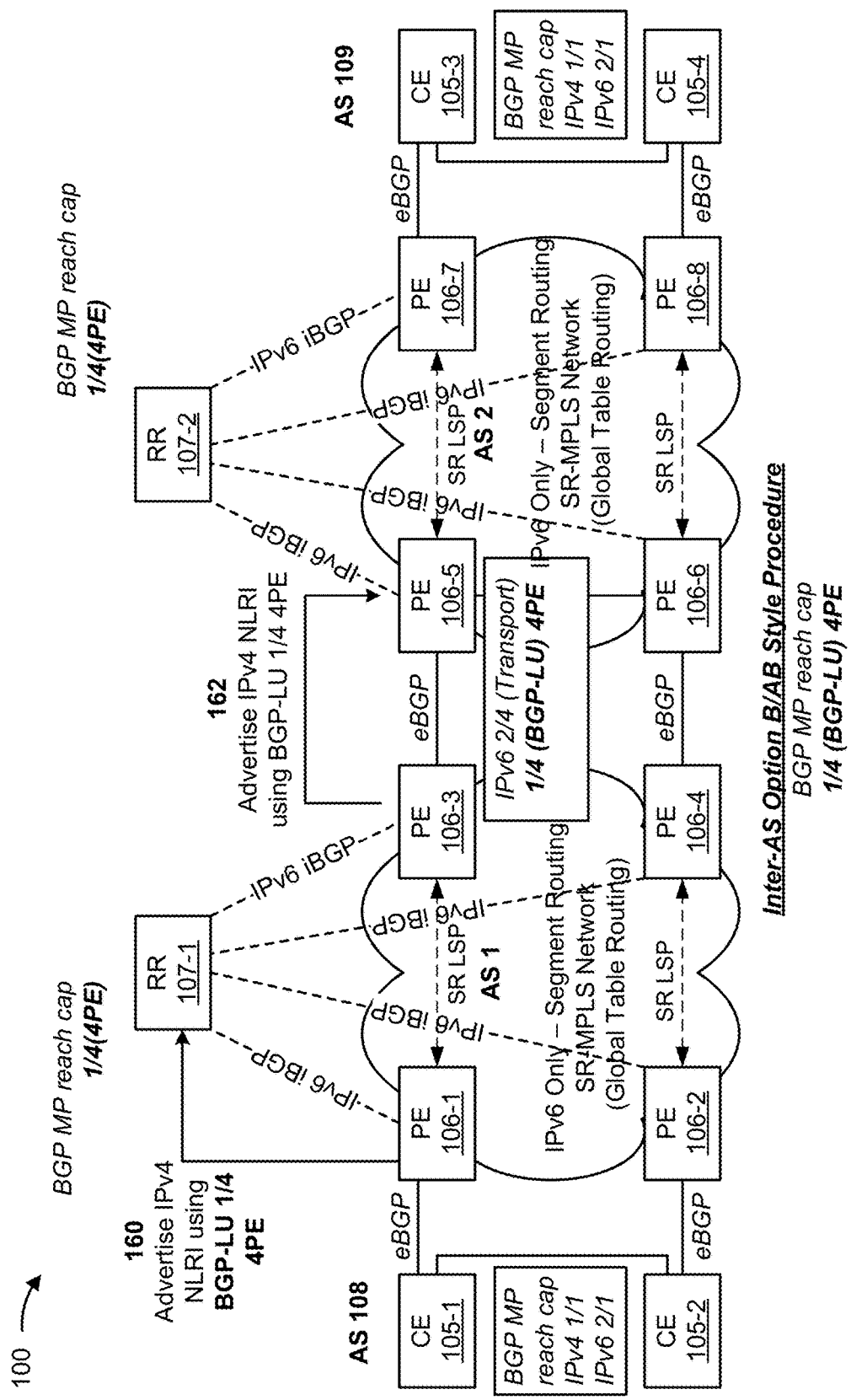
Figure 1G:
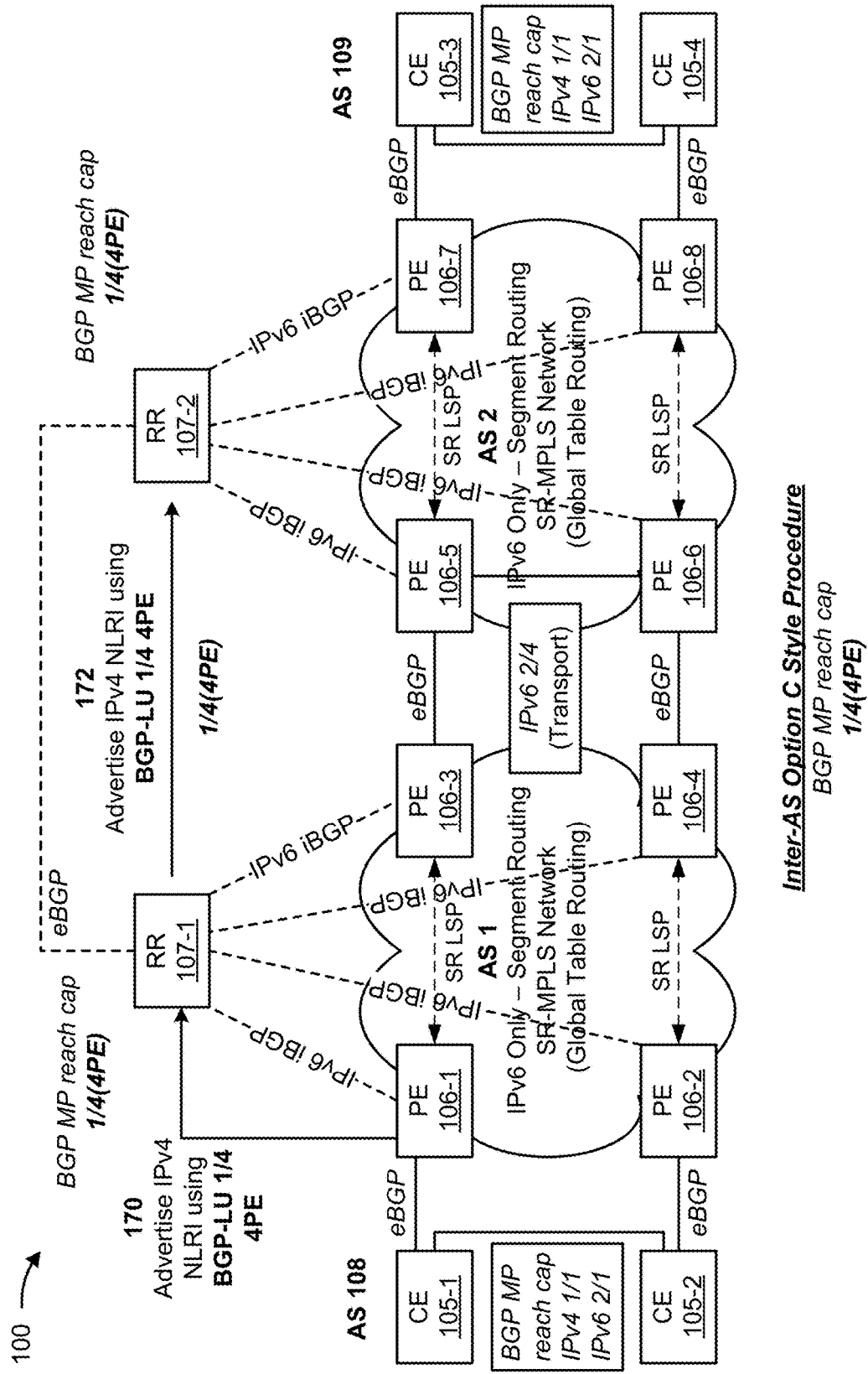
Figure 1H:
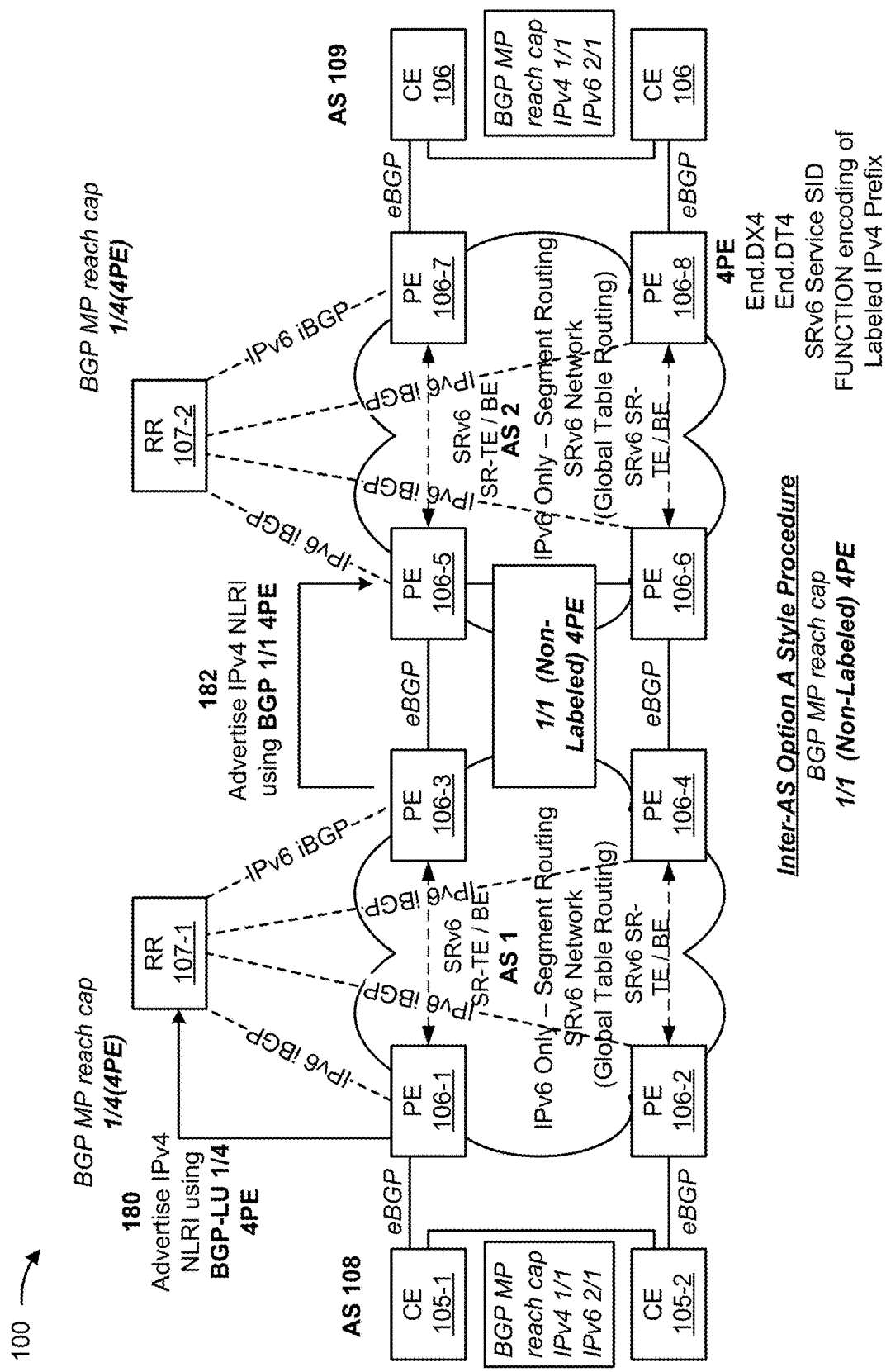
Figure 1I:
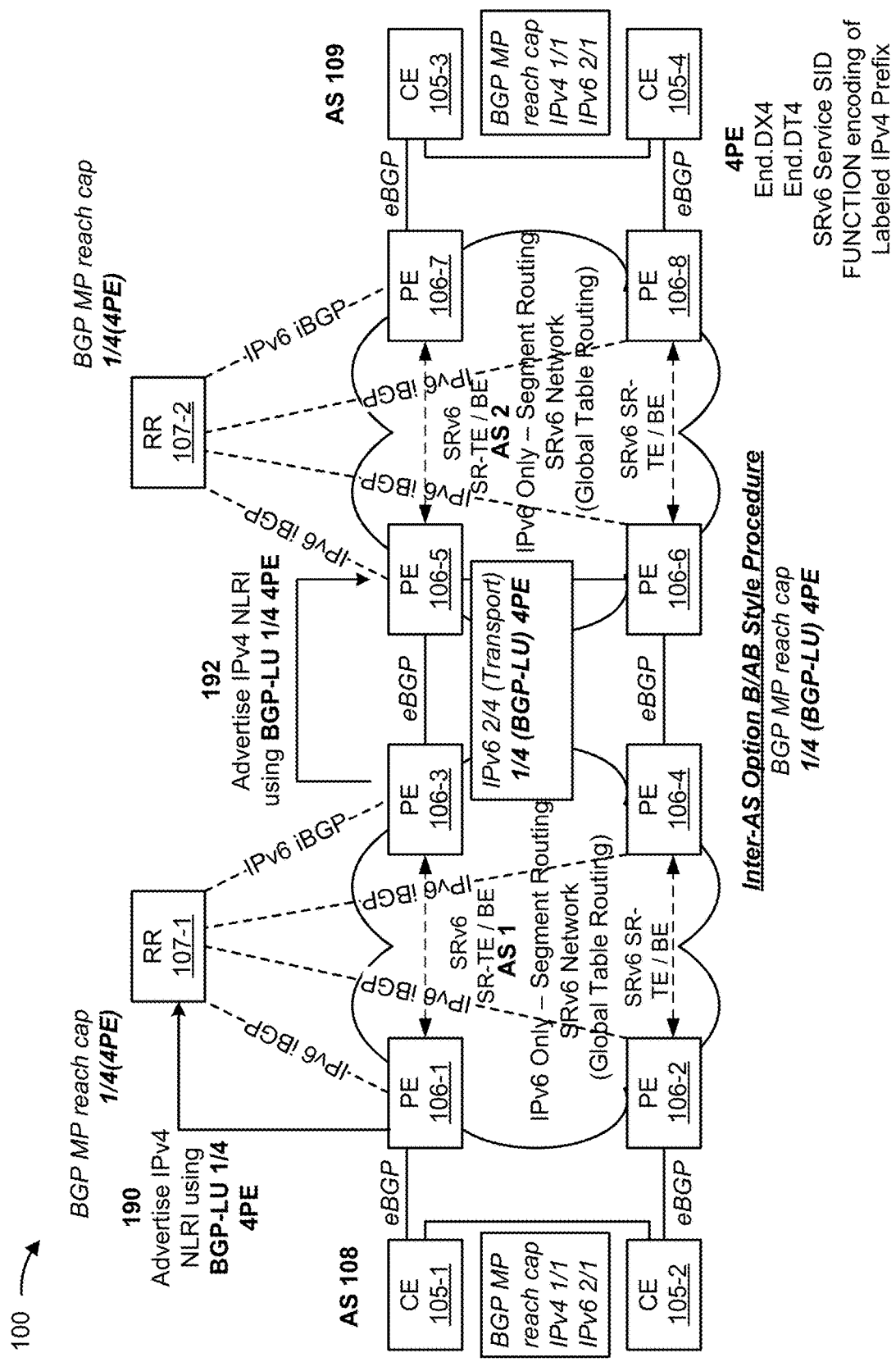
Figure 1J:
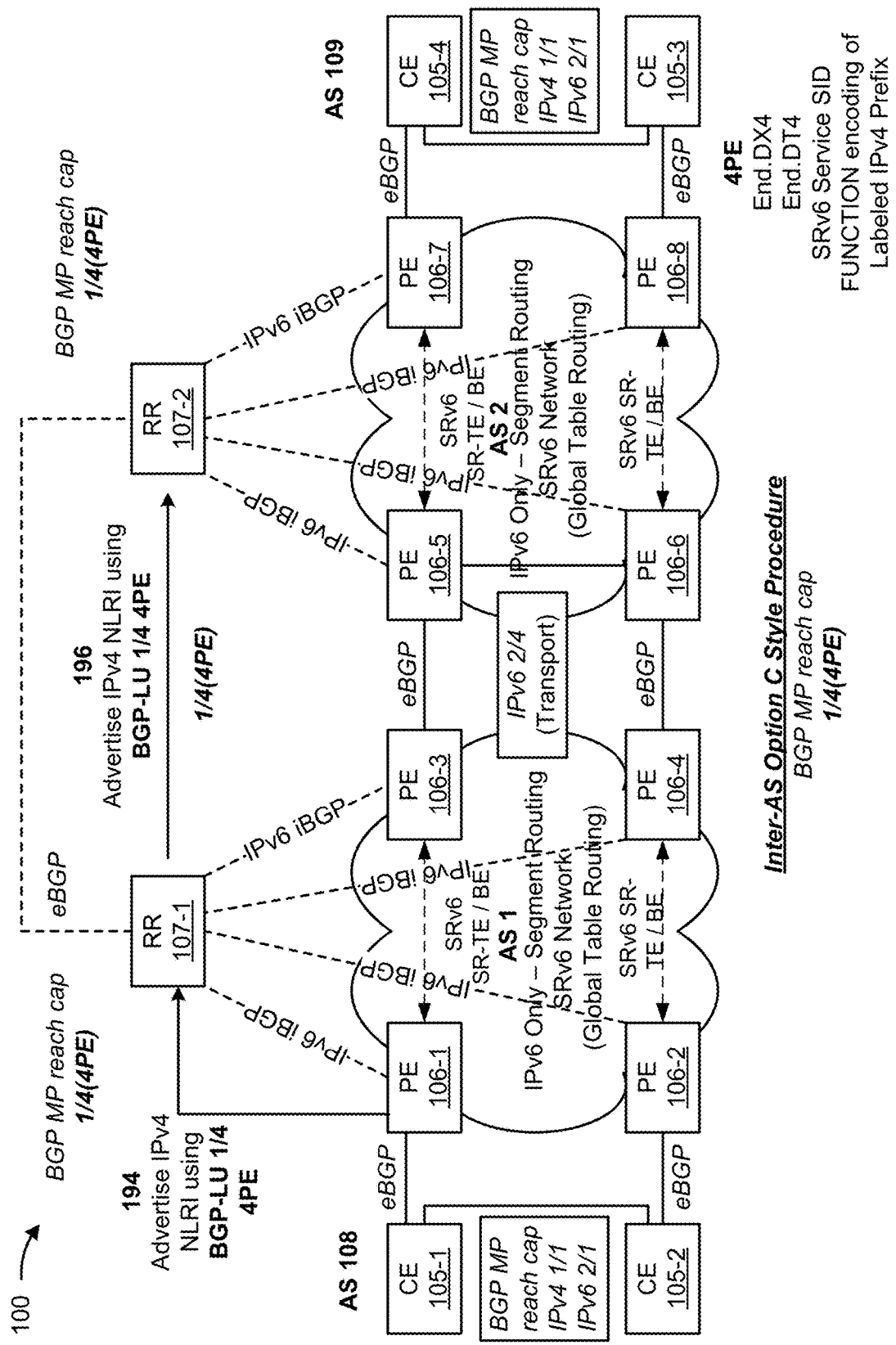

As shown in FIG. 1A, network device 106-1 may connect the first IPv4 Island and the second IPv4 Island over an MPLS LDP IPv6 core network. The MPLS LDP IPv6 core network may be an autonomous system. As shown in FIG. 1A, and by reference number 110, network device 106-1 may advertise IPv4 NLRI using IPv6 next hop encoding. For example, network device 106-1 may exchange MP-BGP MP_REACH capability to advertise IPv4 NLRI over an IPv6 next hop using IPv6 next hop encoding. For instance, an IPv6 address of an egress 4PE may be encoded using next hop encoding for the BGP next hop field (e.g., with a length of 16 or 32 bytes). In some situations, the egress 4PE may be network device 106-3 and the ingress 4PE may be network device 106-1. The next hop may be constructed using "Extended Next-Hop" encoding capability used to dynamically discover whether IPv4 NLRI and VPN-IPv4 NLRI may be exchanged over an IPv6 next hop. For example, the next hop field MUST be set to a 16 byte IPv6 global unicast address only if a global unicast address is present and MUST set to a 32 byte next hop field if also a link local address is included in the next hop field.

As shown in FIG. 1A, and by reference number 112, network device 106-1 may advertise IPv4 NLRI using BGP Labeled Unicast (BGP-LU) 1/4 4PE. For example, network device 106-1 may use BGP-LU to advertise labeled IPv4 prefixes to an RR (e.g., network device 107). RR may then advertise the labeled IPv4 prefixes to other 4PE devices within the AS. Typically, 4PEs may exchange the IPv4 prefixes over MP-BGP sessions established via an IPv6 iBGP peering. The MP-BGP AFI used may be an IPv4 value of 1. In doing so, the 4PEs may convey their IPv6 addresses as a BGP next hop for the advertised IPv4 prefixes.

Additionally, a 4PE may bind a label to the IPv4 prefix. The SAFI used in MP-BGP may be a SAFI value of 4. Ingress and egress PE label stacks, on the 4PE, may contain a service label with bottom of stack "S" bit set and may contain the IPv4 NLRI prefixes "labeled" using BGP-LU, an IPv4 AFI value of 1, and an IPv4 SAFI value of 4.

As shown in FIG. 1A, and by reference number 114, network device 106-1 may establish an LDP LSP transport tunnel from ingress PE 106-1 to egress PE 106-3. For example, network device 106-1 may establish the transport tunnel LDP LSP in order to tunnel IPv4 packets toward network device 106-3. For instance, network device 106-1 may signal the LDP LSP over the IPv6 core network and tunnel the IPv4 packets over the underlay transport LDP LSP in MPLS LDP IPv6 core network. In some examples, the IPv4 packets may be received from a CE, such as network device 105-1.

The LDP LSP (e.g., IPv6-signaled LSP) may be established using any existing technique for label setup using LDP or using resource reservation protocol (RSVP-TE). To ensure interoperability among systems that implement the 4PE described herein, such systems may support building a topmost transport label tunneling using IPv6-signaled MPLS LSPs established by LDP or by RSVP-TE.

In some implementations, network device 106-1 (the ingress 4PE) may forward IPv4 NLRI as labeled prefixes using BGP-LU SAFI over the LDP LSP. Network device 106-1 may forward the IPv4 NLRI toward network device 106-3 (e.g., the egress 4PE identified by the IPv6 address conveyed by the next hop encoding over the IPv6-signaled LSP). The BGP next hop, as described herein, may allow a 4PE (that is to forward IPv4 packets) to automatically via dynamic discovery, establish an IPv6-Signaled MPLS LDP LSP to use to tunnel all IPv4 NLRI between the disparate IPv4 Islands now connected over an IPv6-Only core.

When tunneling IPv4 packets over the IPv6 MPLS core network, rather than successively prepending an IPv6 header and then performing label imposition based on the IPv6 header, network device 106-1 (the ingress 4PE) may directly perform label imposition of an IPv4 header without prepending an IPv6 header.

The label (outer label) imposed may correspond to the IPv6-signaled LSP starting on the ingress 4PE and terminating on the egress 4PE router. While this design concept could theoretically operate in some situations using a single level of labels, there are significant advantages in using a second level of labels that are bound to IPv6 prefixes via MP-BGP advertisements. One of the significant advantages for the use of a second level bottom of stack service label is that it allows for penultimate hop popping (PHP) "implicit-null" special purpose label value "3" on P network device, upstream of the egress 4PE. PHP may still occur due to transmission of the MPLS topmost label preserved due to 2 label stack, instead of having to transmit unlabeled IPv4 packets after the PHP node and have to encapsulate the IPv4 packets appropriately. Another critical reason for the second level label is for Explicit-Null label value "0" where the topmost transport label is preserved and not popped at the PHP node upstream of the egress 4PE device is for Quality of Service (QOS) Pipe mode Differential Service (Diff-Serv) Tunneling model could not be used to carry IPv4 NLRI with a single label since the "IPv6 Explicit-Null Label" cannot be used to carry native IPv4 traffic while it could be used to carry labeled IPv4 traffic. The 4PE design described MUST use a 2 level label stack with the first level topmost transport label being the IPv6-Signaled LSP and the $2^{nd}$ level Bottom of Stack (BOS) label being the BGP-LU IPv4 NLRI labeled prefixes.

The label bound (by MP-BGP to the IPv4 prefix) may indicate to the egress 4PE that the packet is an IPv4 packet. This label advertised by the egress 4PE with MP-BGP may be an arbitrary label value, which identifies an IPv4 routing context or an outgoing interface to forward the IPv4 packet, or could be a IPv4 Explicit-Null Label Pipe mode Diff Serv Tunneling model. An ingress 4PE is to accept any such advertised label.

As shown in FIGS. 1B-1J, the first IPv4 Island and the second IPv4 Island may be connected to different IPv6 core networks. In this regard, the first IPv4 Island and the second IPv4 Island may be connected to different autonomous systems (ASs). The different ASs may be connected using a 4PE (described above). An Inter-AS connectivity may be established by connecting a PE from one AS (e.g., AS 1) to a PE of another AS (e.g., AS 2). In this regard, the PE may provide global table routing reachability between ASs. Such PE may be acting as an ASBR to provide an Inter-AS ASBR to ASBR connectivity and provide PE to PE connectivity between ASN's. In this example, an Inter-AS link may extend the underlay transport LSP between the ASs. The Inter-AS link may enable IPv4 prefixes to be advertised, between ASs, and may use BGP-LU. The Bottom of Stack Label (BOS) S bit MUST be set.

As shown in FIG. 1B, the first AS (e.g., AS 1) may be a first MPLS LDP IPv6 core network, and the second IPv4 Island may be a second MPLS LDP IPv6 core network. As shown in FIG. 1B, IPv4 prefixes may be advertised using an Inter-AS Option A style procedure for 4PEs (e.g., a 4PE Inter-AS extension). As an example, IPv4 prefixes (non-labeled) may be advertised using the Inter-AS Option A style procedure. Under the Inter-AS Option A style procedure, a PE may perform the functions of a CE (without WPLS) with respect to the exchange of IPv4 prefixes. Under the Inter-AS Option A style procedure, the control plane may carry the non-labeled IPv4 prefixes (e.g., via subinterfaces configured according to virtual routing and forwarding (VRF)). The data plane may forward data via an Inter-AS ASBR to ASBR link.

As shown in FIG. 1B, and by reference number 120, network device 106-1 may advertise IPv4 NLRI using BGP-LU 1/4 4PE. For example, network device 106-1 (a source PE router) within AS 1 (a source AS) may use an iBGP WP-BGP peering for carrying IPv4 NLRI over an IPv6 next hop using IPv6 next hop encoding. Network device 106-1 may use BGP-LU to advertise labeled IPv4 prefixes to network device 107-1 (an RR). Network device 107-1 may advertise the labeled IPv4 prefixes to network device 106-3 (an ASBR). As shown in FIG. 1B, an LDP LSP may be established between network device 106-1 and network device 106-3. The IPv6-Signaled LDP LSP may be used for tunneling BGP-LU labeled IPv4 packets between network device 106-1 and network device 106-3.

As shown in FIG. 1B, and by reference number 122, network device 106-3 may advertise IPv4 NLRI using BGP 1/1 4PE. For example, network device 106-3 may use an eBGP peering to advertise non-labeled IPv4 prefixes to network device 106-5. Network device 106-5 may be an ASBR in AS 2. Network device 106-5 may advertise the BGP-LU SAFI value "4" labeled IPv4 prefixes to network device 107-2, an RR in AS 2. Network device 107-2 may advertise the BGP-LU SAFI value "4" labeled IPv4 prefixes to all 4PEs in AS2, including network device 106-7. As shown in FIG. 1B, an IPv6-Signaled LDP LSP may be established between network device 106-5 and network device 106-7. The IPv6-Signaled LDP LSP may be used for tunneling IPv4 packets between network device 106-5 and network device 106-7. In some examples, one or more ASBR interconnections may be established between two ASs. IPv4 may be activated (or configured) on Inter-AS ASBR to ASBR links. Additionally, an ASBR is to be configured with at least one IPv4 address on an interface connected to an Inter-AS ASBR to ASBR link.

Under the Inter-AS Option A style procedure, Inter-AS LSPs may not be used. A separate mesh of LSPs may be provided across 4PEs within each AS for which non-labeled IPv4 prefixes are advertised.

As shown in FIG. 1C, IPv4 prefixes may be advertised using an Inter-AS Option B/AB for 4PEs (e.g., a 4PE Inter-AS extension). The Inter-AS Option B/AB may involve the advertisement of labeled IPv4 prefixes over a segmented LSP using Inter-AS Option B/AB.

Under the Inter-AS Option B/AB option style procedure, ASBRs may be configured for BGP-LU (in contrast to the Inter-AS Option A style procedure). In the Inter-AS Option B/AB style procedure, the control plane may carry service label prefixes in the label stack while the data plane may forward data over an Inter-AS ASBR to ASBR link.

As shown in FIG. 1C, and by reference number 130, network device 106-1 may advertise IPv4 NLRI using BGP-LU 1/4. For example, network device 106-1 (the source 4PE) with AS 1 (the source AS) may use iBGP MP-BGP peering to carry IPv4 NLRI over an IPv6 next hop using IPv6 Next hop encoding. Network device 106-1 may use BGP-LU to advertise labeled IPv4 prefixes to network device 107-1 (a RR). As shown in FIG. 1C, network device 107-1 may advertise the labeled IPv4 prefixes to network device 106-3 (an ASBR). Network device 106-3 may be connected to network device 106-5 via an eBGP peer. Network device 106-5 may be an ASBR in AS 2 (the destination AS).

As shown in FIG. 1C, and by reference number 132, network device 106-3 may advertise IPv4 NLRI using BGP-LU 1/4 4PE. For example, network device 106-3 may use eBGP to advertise the labeled IPv4 prefixes to network device 106-5. Network device 106-5 may advertise the IPv4 prefixes to network device 107-2, an RR within AS 2. Network device 107-2 may advertise the IPv4 prefixes to all 4PEs in AS2, including network device 106-7.

In some examples, one or more ASBR interconnections may be established between two ASs. The label stack on an ASBR to ASBR link may be two labels deep, namely an IPv6 topmost transport label IPv6-Signaled LSP using BGP-LU and a bottom of stack IPv4 BGP-LU service label. The IPv6 topmost transport label may be associated with an IPv6 AFI value of 2, and a SAFI value of 4. The bottom of stack IPv4 BGP-LU service label may be associated with an IPv4 AFI value of 2 and a SAFI value of 4. Thus, IPv4 may be not required to be activated on Inter-AS ASBR to ASBR links as IPv4 is tunneled through the IPv6-Signaled LSP.

Under the Inter-AS Option B/AB option style procedure, LSPs may be established across ASs. Accordingly, the Inter-AS Option B/AB option style procedure may promote a trust relationship between service providers in extending Inter-AS LSPs between ASBRs.

As shown in FIG. 1D, labeled IPv4 prefixes may be advertised (e.g., multi-hop advertisement) using an Inter-AS Option C style procedure (e.g., a 4PE Inter-AS extension). The Inter-AS Option C style procedure may involve an RR to RR control plane multi-hop eBGP advertisement of labeled IPv4 unicast prefixes. The eBGP advertisement may be between a source AS and a destination AS. The eBGP advertisement of labeled unicast IPv4 prefixes may be performed via an Inter-AS link transport underlay. Under the Inter-AS Option C style procedure, the 4PE IPv4 BGP-LU routing information is not maintained on the ASBR. The Inter-AS Option C style procedure may be equivalent to using Inter-AS Option C for exchange of VPN IPv4 prefixes.

As shown in FIG. 1D, by reference number 140, network device 106-1 may advertise IPv4 NLRI using BGP-LU 1/4 4PE, in a manner similar to the manner described above in connection with FIG. 1C. For example, network device 106-1 may use iBGP MP-BGP carrying IPv4 NLRI over an IPv6 next hop, using IPv6 next hop encoding. Network device 106-1 may use BGP-LU to advertise the control plane labeled IPv4 prefixes to network device 107-1. Network device 106-1 may be a source 4PE within AS 1 (a source AS).

As shown in FIG. 1D, by reference number 142, network device 107-1 may advertise IPv4 NLRI using BGP-LU 1/4 4PE. For example, network device 107-1 may advertise the labeled IPv4 unicast prefixes, over an eBGP multi-hop Inter-AS peering, to network device 107-2 in AS 2 (a destination AS). Network device 106-1 may use an eBGP peering to advertise, via the Inter-AS ASBR to ASBR link, the core underlay labeled unicast IPv6 PE loopback prefixes in the underlay to network device 106-5 (an ASBR in the destination AS).

Network device 106-5 may advertise IPv6 PE loopback prefixes to network device 107-2. Network device 107-2 may advertise the IPv6 PE loopback prefixes to all PEs within AS 2 to establish an end to end LSP from an ingress PE (e.g., network device 106-1) in the source AS to an egress PE (e.g., network device 106-5) in the destination AS.

Under the Inter-AS Option C style procedure, the control plane carrying the service label prefixes eBGP multi-hop (RR to RR) is separated from the data plane forwarding data over an Inter-AS ASBR to ASBR link. The data plane may carry the underlay PE loopbacks advertised using BGP-LU between a source AS and a destination AS over the Inter-AS ASBR to ASBR link. The PE loopbacks (e.g., core AS underlay/128 PE loopbacks) may be advertised via an IPv6 AFI value of 2 and a SAFI value of 4. The PE loopbacks may be forwarded via the Inter-AS ASBR to ASBR link.

Under the Inter-AS Option C style procedure, IPv4 need not be activated on Inter-AS ASBR to ASBR links. The label stack on an ASBR to ASBR link may be 2 labels deep, as explained above in connection with FIG. 1C. In some situations, under the Inter-AS Option C style procedure, the exchange of IPv4 prefixes control plane function may be initiated after an IPv6 end to end LSP has been established between the source AS and the destination AS.

FIG. 1E describes the advertisement of IPv4 prefixes using the Inter-AS Option A style procedure for 4PEs over an IPv6 SR-MPLS core network. Advertising IPv4 prefixes using the Inter-AS Option A style procedure has been described above in connection with FIG. 1E. As shown in FIG. 1E, and by reference number 150, network device 106-1 may advertise IPv4 NLRI using BGP-LU 1/4 4PE, in a manner similar to the manner described above in connection with FIG. 1E. As shown in FIG. 1E, and by reference number 152, 4PE network device 106-3 may advertise IPv4

NLRI (Non Labeled), in a manner similar to the manner described above in connection with FIG. 1E.

FIG. 1F describes the advertisement of IPv4 prefixes using the Inter-AS Option B/AB style procedure for 4PEs over an IPv6 SR-MPLS core network. Advertising IPv4 prefixes using the Inter-AS Option B/AB style procedure has been described above in connection with FIG. 1C. As shown in FIG. 1F, and by reference number 160, network device 106-1 may advertise IPv4 NLRI using BGP-LU 1/4 4PE, in a manner similar to the manner described above in connection with FIG. 1C. As shown in FIG. 1F, and by reference number 162, network device 106-3 may advertise IPv4 NLRI using BGP-LU 1/4 4PE, in a manner similar to the manner described above in connection with FIG. 1C.

FIG. 1G describes the multi-hop advertisement of labeled IPv4 prefixes using the Inter-AS Option C style procedure for 4PEs over an IPv6 SR-MPLS core network. Advertising IPv4 prefixes using the Inter-AS Option B/AB style procedure has been described above in connection with FIG. 1D. As shown in FIG. 1G, and by reference number 170, network device 106-1 may advertise IPv4 NLRI using BGP-LU 1/4 4PE, in a manner similar to the manner described above in connection with FIG. 1D. As shown in FIG. 1G, and by reference number 172, network device 107-2 may advertise IPv4 NLRI using BGP-LU 1/4 4PE, in a manner similar to the manner described above in connection with FIG. 1D.

FIG. 1H describes the advertisement of IPv4 prefixes using the Inter-AS Option A style procedure for 4PEs over an SRv6 core network. Advertising IPv4 prefixes using the Inter-AS Option A style procedure has been described above in connection with FIG. 1B. As shown in FIG. 1E, and by reference number 180, network device 106-1 may advertise IPv4 NLRI using BGP-LU 1/4 4PE, in a manner similar to the manner described above in connection with FIG. 1B. As shown in FIG. 1E, and by reference number 182, network device 106-3 may advertise IPv4 NLRI using BGP 1/1 4PE, in a manner similar to the manner described above in connection with FIG. 1B. Under the Inter-AS Option A, the data plane, encoded in a L3 VPN equivalent label stack encoded into SRv6 security identifier (SID) function field of SRv6 SID, may carry the non-labeled IPv4 prefix for SRv6 programming End.DX4 and End.DT4 functions.

FIG. 1I describes the advertisement of IPv4 prefixes using the Inter-AS Option B/AB style procedure for 4PEs over an SRv6 core network. Advertising IPv4 prefixes using the Inter-AS Option B/AB style procedure has been described above in connection with FIG. 1C. As shown in FIG. 1I, and by reference number 190, network device 106-1 may advertise IPv4 NLRI using BGP-LU 1/4 4PE, in a manner similar to the manner described above in connection with FIG. 1C. As shown in FIG. 1I, and by reference number 192, network device 106-3 may advertise IPv4 NLRI using BGP-LU 1/4 4PE, in a manner similar to the manner described above in connection with FIG. 1C.

FIG. 1J describes the multi-hop advertisement of labeled IPv4 prefixes using the Inter-AS Option C style procedure for 4PEs over an SRv6 core network. Advertising IPv4 prefixes using the Inter-AS Option C style procedure has been described above in connection with FIG. 1D. As shown in FIG. 1J, and by reference number 194, network device 106-1 may advertise IPv4 NLRI using BGP-LU 1/4 4PE, in a manner similar to the manner described above in connection with FIG. 1D. As shown in FIG. 1G, and by reference number 196, network device 107-2 may advertise IPv4 NLRI using BGP-LU 1/4 4PE, in a manner similar to the manner described above in connection with FIG. 1D.

By connecting IPv4 Islands without manual configuration of a tunnel as described herein, implementations described herein may preserve computing resources, network resources, storages resources, among other examples that would have otherwise been consumed by manually configuring the tunnel. The 4PE framework described herein is fully applicable to full mesh BGP peering between ingress PEs and egress PEs, as well as when RRs are utilized as per BGP specification.

The 4PEs described herein provide connectivity to CE of IPv4 Islands. The 4PEs may also provide other services simultaneously (IPv6 connectivity, IPv6 L3VPN services, IPv6 L2VPN services, etc.). With the 4PE approach, no tunnels need to be explicitly configured, and no IPv6 headers need to be inserted in front of the IPv4 packets between a CE and a 4PE. The 4PE framework described herein may be used for customers that require IPv4 and IPv6 service as well as for customers that require IPv4-only connectivity, thus providing global IPv4 reachability.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
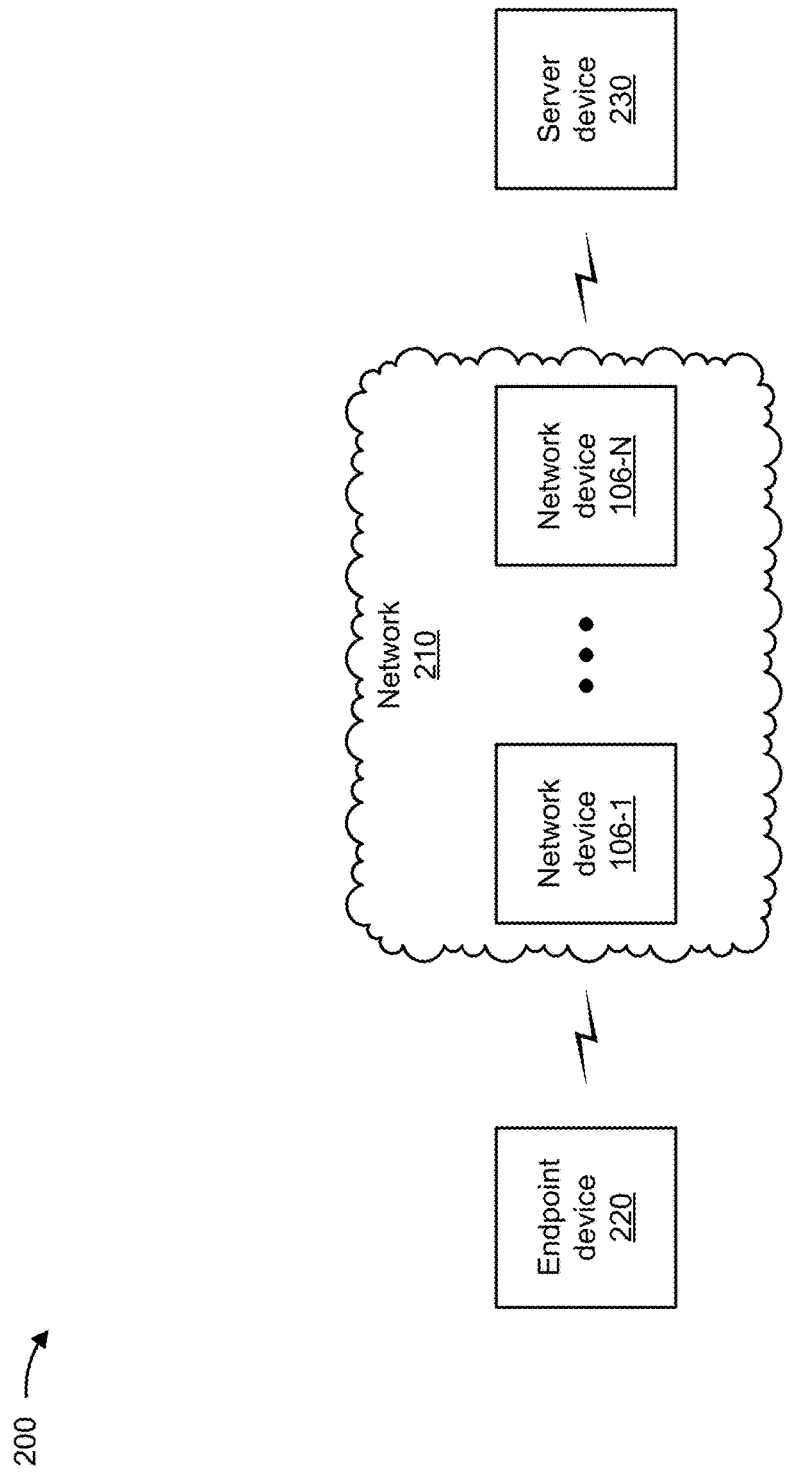
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 106 (shown as network device 106-1 through network device 106-N), endpoint device 220, server device 230, and a network 210. Devices of environment 200 may interconnect via wired connections, wireless connections, or a combination of wired and wireless connections.

Network device 106 includes one or more devices capable of receiving, processing, storing, routing, and/or providing traffic (e.g., a packet or other information or metadata) in a manner described herein. For example, network device 106 may include a router, such as an LSR, a label edge router (LER), an ingress router, an egress router, a provider router (e.g., a provider edge router or a provider Core router), a virtual router, or another type of router. Additionally, or alternatively, network device 106 may include a gateway, a switch, a firewall, a hub, a bridge, a reverse proxy, a server (e.g., a proxy server, a cloud server, or a data center server), a load balancer, and/or a similar device. In some implementations, network device 106 may be a physical device implemented within a housing, such as a chassis. In some implementations, network device 106 may be a virtual device implemented by one or more computer devices of a cloud computing environment or a data center. In some implementations, a group of network devices 106 may be a group of data center nodes that are used to route traffic flow through network 210.

Endpoint device 220 includes one or more devices capable of receiving, generating, storing, processing, and/or providing information, such as information described herein. For example, endpoint device 220 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 220 may receive network traffic from and/or may provide network traffic to other endpoint devices 220 and/or server device 230, via network 210 (e.g., by routing packets using network devices 106 as intermediaries).

Server device 230 includes one or more devices capable of receiving, generating, storing, processing, and/or providing information, such as information described herein. For example, server device 230 may include a laptop computer, a tablet computer, a desktop computer, a group of server devices, or a similar type of device. In some implementations, server device 230 may receive information from and/or transmit information (e.g., traffic) to endpoint device 220, via network 210 (e.g., by routing packets using network devices 106 as intermediaries).

Network 210 includes one or more wired and/or wireless networks. For example, network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN))), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
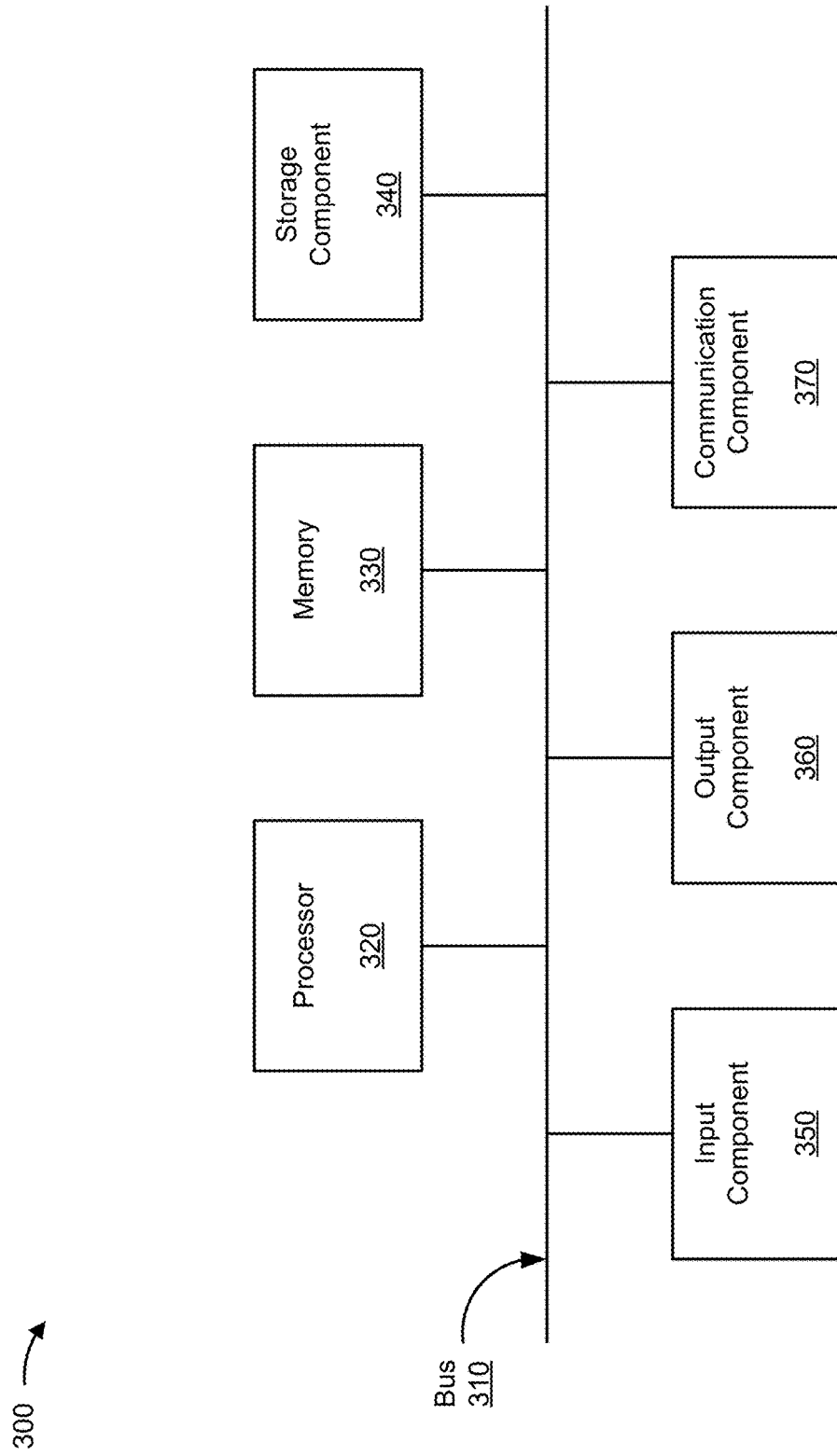
FIGS. 3 and 4 are diagrams of example components of one or more devices of FIG. 2.

FIG. 3 is a diagram of example components of one or more devices of FIG. 2. The example components may be included in a device 300, which may correspond to network device 106, endpoint device 220, and/or server device 230. In some implementations, network device 106, endpoint device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
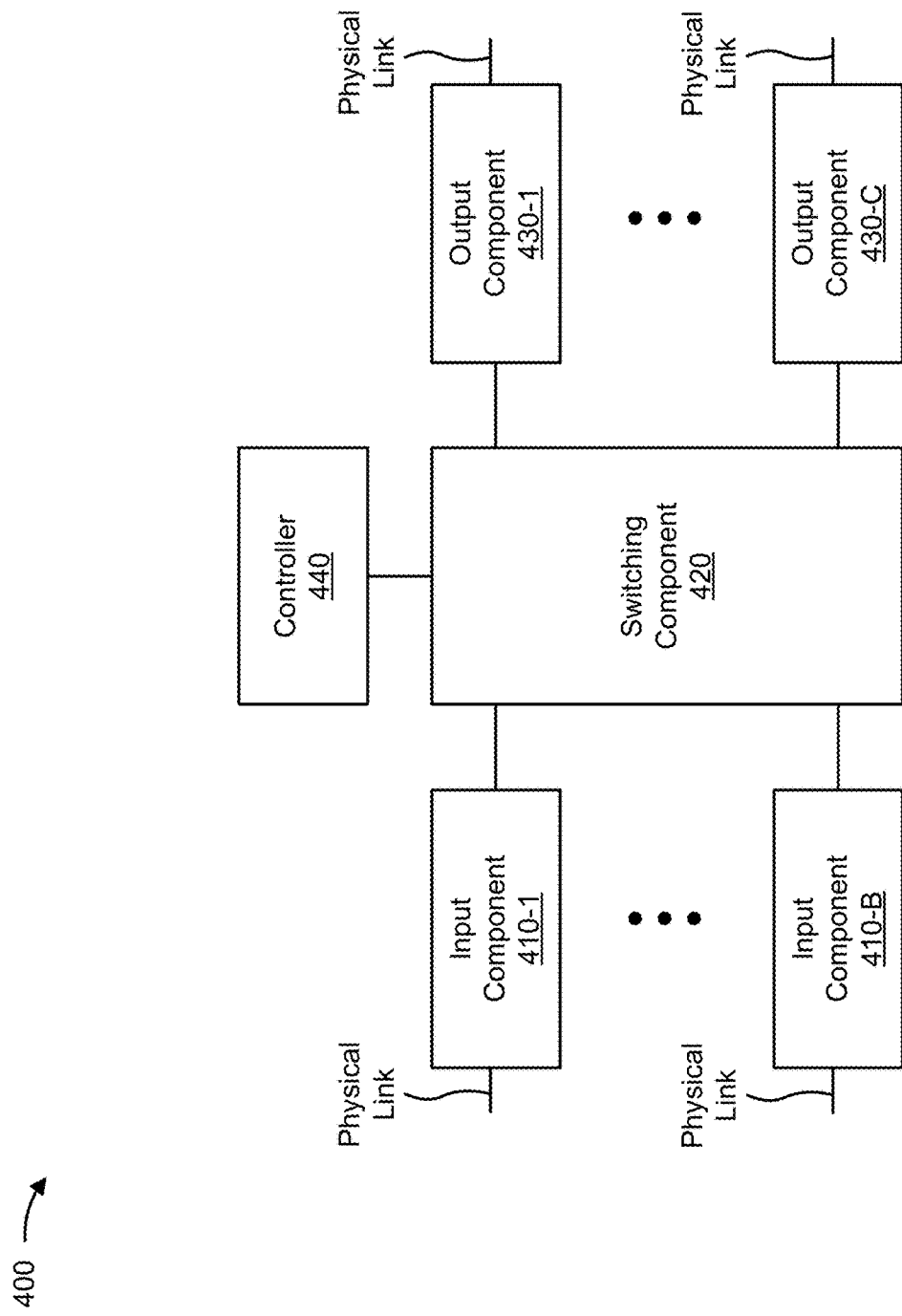

FIG. 4 is a diagram of example components of one or more devices of FIG. 2. The example components may be included in a device 400. Device 400 may correspond to network device 106. In some implementations, network device 106 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
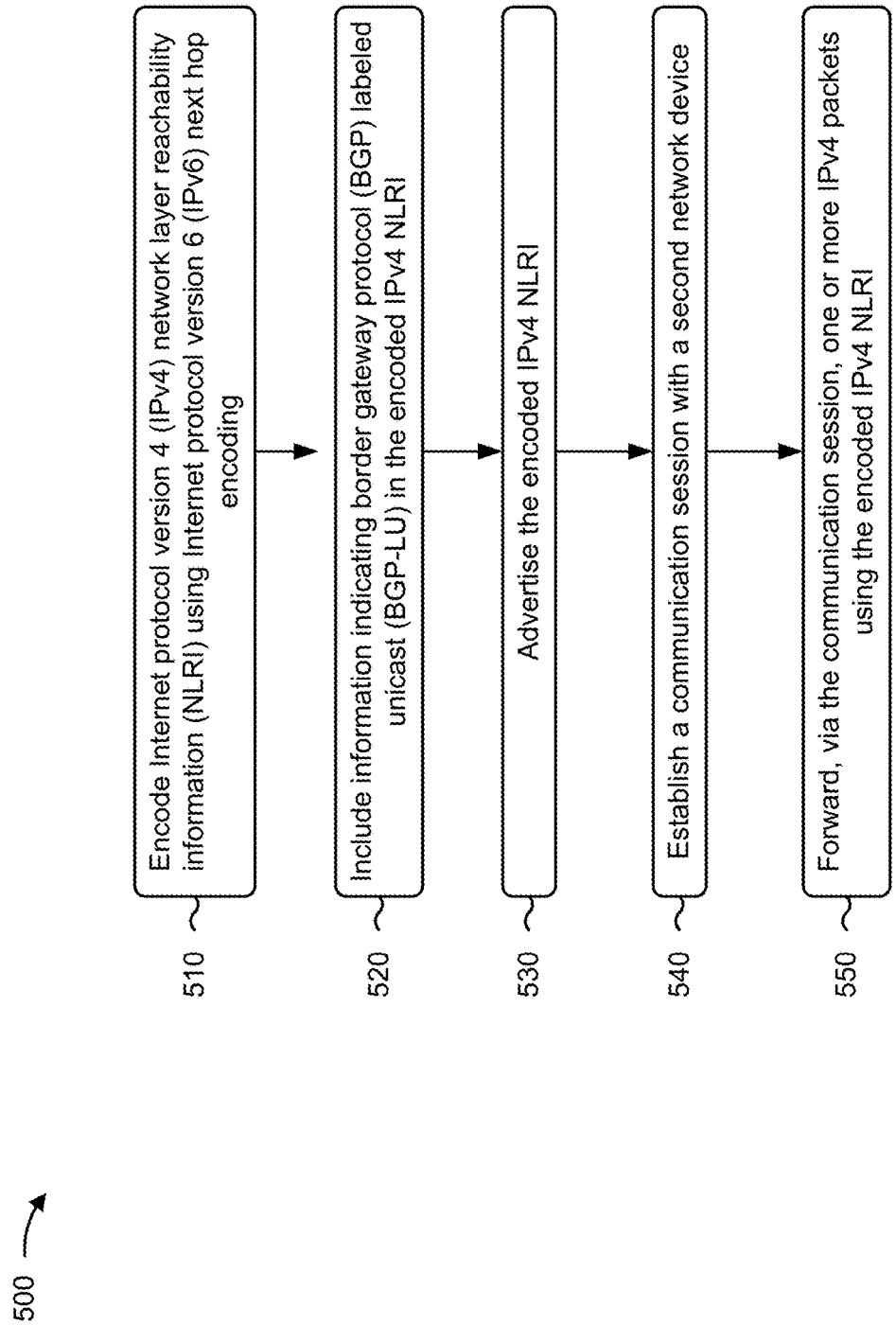
FIG. 5 is a flowchart of an example process for connecting IPv4 Islands over an IPv6 core network.

FIG. 5 is a flowchart of an example process 500 for connecting IPv4 Islands over an IPv6 core network. In some implementations, one or more process blocks of FIG. 5 may be performed by a first network device (e.g., first network device 106-1). In some implementations, one or more process blocks of FIG. 5 may be performed by another device or a group of devices separate from or including the first network device, such as a CE (e.g., network device 105-1) and/or an RR (e.g., network device 107-1). Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include encoding Internet ProtocolIPv4 NLRI using Internet ProtocolIPv6 next hop encoding to generate encoded IPv4 NLRI (block 510). For example, the first network device may encode Internet ProtocolIPv4 NLRI using Internet ProtocolIPv6 next hop encoding to generate encoded IPv4 NLRI, as described above.

As further shown in FIG. 5, process 500 may include including information indicating BGP-LU in the encoded IPv4 NLRI (block 520). For example, the first network device may include information indicating BGP-LU in the encoded IPv4 NLRI, as described above.

As further shown in FIG. 5, process 500 may include advertising the encoded IPv4 NLRI (block 530). For example, the first network device may advertise the encoded IPv4 NLRI, as described above.

As further shown in FIG. 5, process 500 may include establishing a communication session with a second network device (block 540). For example, the first network device may establish a communication session with a second network device, wherein the communication session is established via an IPv6 core network, as described above. In some implementations, the communication session is established via an IPv6 core network.

The first network device may be included in a first autonomous system and the second device may be included in a second autonomous system.

As further shown in FIG. 5, process 500 may include forwarding, via the communication session, one or more IPv4 packets using the encoded IPv4 NLRI (block 550). For example, the first network device may forward, via the communication session, one or more IPv4 packets using the encoded IPv4 NLRI, as described above.

In some implementations, establishing the communication session comprises establishing a label switched path, and wherein forwarding the one or more IPv4 packets comprises forwarding the one or more IPv4 packets via the label switched path.

In some implementations, the information indicating BGP-LU includes an AFI and a SAFI, and wherein a value of the AFI is different than a value of the SAFI.

In some implementations, the first network device is a first provider edge network device, wherein the method further comprises receiving the one or more IPv4 packets from a first customer edge network device, and wherein forwarding the one or more IPv4 packets comprises forwarding the one or more IPv4 packets toward a second customer edge network device connected to a second provider edge network device.

In some implementations, the IPv6 core network includes an MPLS LDP IPv6 core network, an SR MPLS IPv6 core network, or a SR over IPv6 (SRv6) core network.

In some implementations, the first network device is configured with an IPv4 address and an IPv6 address.

In some implementations, the communication session is a MP BGP session, and wherein advertising the IPv4 NLRI comprises providing IPv4 prefixes over the MP-BGP session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    encoding, by a first network device, Internet Protocol version 4 (IPv4) network layer reachability information (NLRI) using Internet Protocol version 6 (IPv6) next hop encoding to generate encoded IPv4 NLRI;
    including, by the first network device, information indicating border gateway protocol (BGP) labeled unicast (BGP-LU) in the encoded IPv4 NLRI;
    advertising, by the first network device, the encoded IPv4 NLRI;
    establishing, by the first network device, a communication session with a second network device,
        wherein the communication session is established via an IPv6 core network, and
        wherein the communication session is established as part of a 4PE framework for transmission of the IPv4 packets; and
    forwarding, by the first network device and via the communication session, one or more IPv4 packets using the encoded IPv4 NLRI,
        wherein the one or more IPv4 packets are forwarded as part of the 4PE framework.

2. The method of claim 1, wherein establishing the communication session comprises:
    establishing a label switched path; and
    wherein forwarding the one or more IPv4 packets comprises:

forwarding the one or more IPv4 packets via the label switched path.

3. The method of claim 1, wherein the information indicating BGP-LU includes an address family identifier (AFI) and a subsequent address family identifier (SAFI), and wherein a value of the AFI is different than a value of the SAFI.

4. The method of claim 1, wherein the first network device is a first provider edge network device,
wherein the method further comprises:
receiving the one or more IPv4 packets from a first customer edge network device, and
wherein forwarding the one or more IPv4 packets comprises:
forwarding the one or more IPv4 packets toward a second customer edge network device connected to a second provider edge network device.

5. The method of claim 1, wherein the IPv6 core network includes:
a multiprotocol label switching (MPLS) label distribution protocol (LDP) IPv6 core network,
a segment routing (SR) MPLS IPv6 core network, or
a SR over IPv6 (SRv6) core network.

6. The method of claim 1, wherein the first network device is configured with an IPv4 address and an IPv6 address.

7. The method of claim 1, wherein the communication session is a multiprotocol BGP (MP BGP) session, and
wherein advertising the encoded IPv4 NLRI comprises:
providing IPv4 prefixes over the MG BGP session.

8. A device, comprising:
one or more processors configured to:
encode Internet Protocol version 4 (IPv4) network layer reachability information (NLRI) using Internet Protocol version 6 (IPv6) next hop encoding to generate encoded IPv4 NLRI;
include information indicating border gateway protocol (BGP) labeled unicast (BGP-LU) in the encoded IPv4 NLRI;
advertise the encoded IPv4 NLRI; and
forward, via an Internet Protocol version 6 (IPv6) core network, one or more IPv4 packets using the encoded IPv4 NLRI,
wherein the one or more IPv4 packets are forwarded as part pf a 4PE framework.

9. The device of claim 8, wherein the device is a first device,
wherein the one or more processors are further configured to:
establish a communication session with a second device,
wherein the communication session is established via an Internet Protocol version 6 (IPv6) core network, and
wherein the one or more IPv4 packets are forwarded toward the second device via the communication session.

10. The device of claim 9, wherein the first device is included in a particular autonomous system, and
wherein the second device is included in the particular autonomous system.

11. The device of claim 9, wherein the first device is included in a first autonomous system, and
wherein the second device is included in a second autonomous system.

12. The device of claim 8, wherein the device is a first provider edge network device,
wherein the one or more processors are further configured to:
receive the one or more IPv4 packets from a first customer edge network device.

13. The device of claim 12, wherein, to forward the one or more IPv4 packets, the one or more processors are configured to:
forward the one or more IPv4 packets toward a second customer edge network device connected to a second provider edge network device.

14. The device of claim 8, wherein the IPv6 core network includes:
a multiprotocol label switching (MPLS) label distribution protocol (LDP) IPv6 core network,
a segment routing (SR) MPLS IPv6 core network, or
a SR over IPv6 (SRv6) core network.

15. A non-transitory computer-readable medium storing a set of instructions, the set of instructions comprising:
one or more instructions that, when executed by one or more processors of a device, cause the device to:
encode Internet Protocol version 4 (IPv4) network layer reachability information (NLRI) using Internet Protocol version 6 (IPv6) next hop encoding to generate encoded IPv4 NLRI;
include, in the encoded IPv4 NLRI, information indicating border gateway protocol (BGP) labeled unicast (BGP-LU); and
advertise the encoded IPv4 NLRI via an IPv6 BGP communication session,
wherein the IPv6 BGP communication session is established as part of a 4PE framework for connecting IPv4 islands over an IPv6 core network.

16. The non-transitory computer-readable medium of claim 15, wherein the one or more instructions, when executed by the one or more processors, further cause the device to:
forward, via the IPv6 core network, one or more IPv4 packets using the encoded IPv4 NLRI.

17. The non-transitory computer-readable medium of claim 16, wherein the one or more instructions, when executed by the one or more processors, further cause the device to:
establish a label switched path over the IPv6 core network,
wherein the one or more IPv4 packets are forwarded via the label switched path.

18. The non-transitory computer-readable medium of claim 15, wherein the IPv6 core network includes:
a multiprotocol label switching (MPLS) label distribution protocol (LDP) IPv6 core network,
a segment routing (SR) MPLS IPv6 core network, or
a SR over IPv6 (SRv6) core network.

19. The non-transitory computer-readable medium of claim 15, wherein the device is a first provider edge network device, and
wherein the one or more instructions, when executed by the one or more processors, further cause the device to:
receive one or more IPv4 packets from a first customer edge network device, and
forward the one or more IPv4 packets toward a second customer edge network device connected to a second provider edge network device.

20. The non-transitory computer-readable medium of claim 15, wherein the device is configured with an IPv4 address and an IPv6 address.

* * * * *